United States Patent [19]

Wallin

[11] 4,162,773
[45] Jul. 31, 1979

[54] DEVICE FOR USE IN EMERGENCY LOCKING MECHANISM FOR WEBBING-TYPE SEAT BELTS

[75] Inventor: Jan-Olof Wallin, Ellerau, Sweden
[73] Assignee: Irvin Industries, Inc., Sweden
[21] Appl. No.: 894,767
[22] Filed: Apr. 10, 1978
[30] Foreign Application Priority Data
  Apr. 22, 1977 [SE] Sweden ............................. 7704686
[51] Int. Cl.² .................. A62B 35/02; B65H 75/48
[52] U.S. Cl. ............................................ 242/107.4 A
[58] Field of Search ............... 242/107.4 R–107.4 E; 297/388; 280/744–747

[56] References Cited
U.S. PATENT DOCUMENTS 3,851,837 12/1974 Griffin ........................... 242/107.4 A
4,029,267 6/1977 Slipper ........................... 242/107.4 A Primary Examiner—Harvey C. Hornsby
Assistant Examiner—John M. Jillions
Attorney, Agent, or Firm—Shlesinger, Fitzsimmons & Shlesinger

[57] ABSTRACT

The belt or webbing is wound on a spool, which is rotatably mounted between the spaced legs or sides of a generally U-shaped casing, and which has a ratchet wheel secured to one end thereof. A pawl is pivotally mounted in supporting slots in one or more of the casing sides for pivotal movement into and out of a belt-locking position in which one edge of the pawl engages a tooth of the ratchet wheel to prevent further rotation of the spool in a belt unwinding direction. A leafspring, which is secured at one end to the pawl, passes over the head of a pendulum member which is suspended from the pawl, and has a free end confronting and normally spaced from the wheel teeth. When sudden changes in vehicle speed cause the pendulum to swing, its head moves the leafspring to engage the wheel teeth, which, when the belt is unwound, swing the leafspring in a direction which causes the supporting pawl to be pivoted to its belt-locking position.

12 Claims, 5 Drawing Figures

DEVICE FOR USE IN EMERGENCY LOCKING MECHANISM FOR WEBBING-TYPE SEAT BELTS

The following invention concerns a device for use in emergency locking mechanisms for webbing-type seat belts, in which the webbing strap is retracted into a casing, mounted in a vehicle, comprising a spindle on which the strap is wound and which is connected with a ratchet-wheel in a locking mechanism comprising a device sensitive to movement, such as a pendulum or ball, which, when activated by predetermined changes in the motion of the vehicle, causes an arm to engage with the ratchet-wheel, whereby force is transferred to the arm by the continued rotation of the ratchet-wheel and passed on to a locking device which, in turn, engages with the ratchet-wheel and locks the spindle in order to prevent the webbing strap from unwinding.

The component parts of this device are thus the ratchet united with the spindle, the locking device, which locks the ratchet-wheel, the arm activated by the device sensitive to the movement of the vehicle ("vehicle-triggered") and causing the locking device to engage with the vehicle-triggered device itself, which comprises a pendulum, ball or the like. A difficulty met within devices of the type described has been to design and assemble these components in such a way as to achieve a simple, well-functioning mechanism which is yet small enough to be built into an emergency locking mechanism of suitable size.

The primary purpose of this invention is therefore to achieve a simple locking mechanism of small dimensions, but which can yet be activated quickly and reliably, for use in a device of the type described above.

This goal is attained in that the device, under the terms of this invention, is provided with the characteristics specified in the claims to follow.

In the following paragraphs, the invention will be described in the form of at least two embodiments, with reference being had to the accompanying drawings, wherein.

Figure 1:
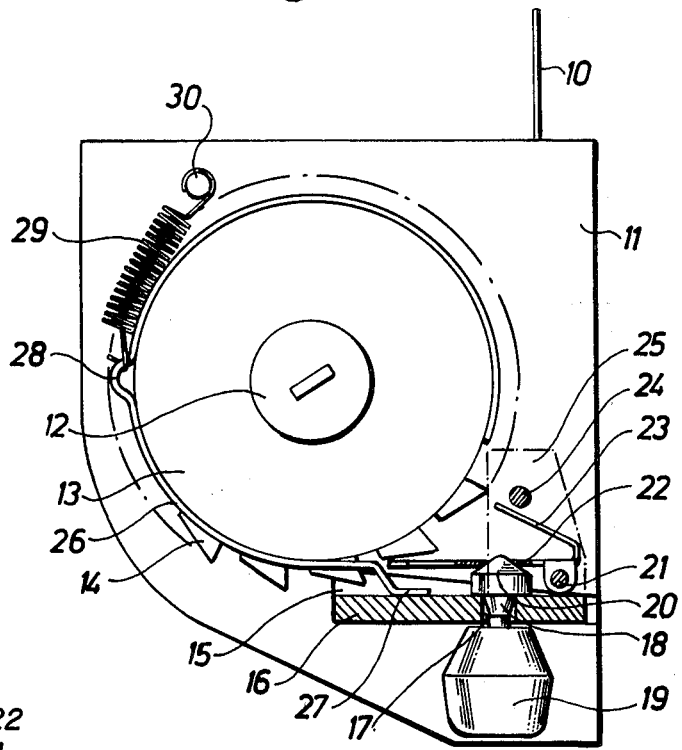
FIG. 1 shows a side elevation, partly in section, of an emergency locking mechanism constructed in accordance with one embodiment of the invention.
Figure 2A:
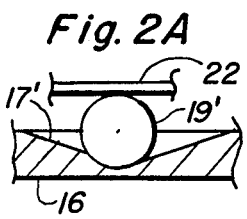
FIG. 2A is a fragmentary sectional view showing a modified form of the triggering device shown in FIG. 2.
Figure 2:
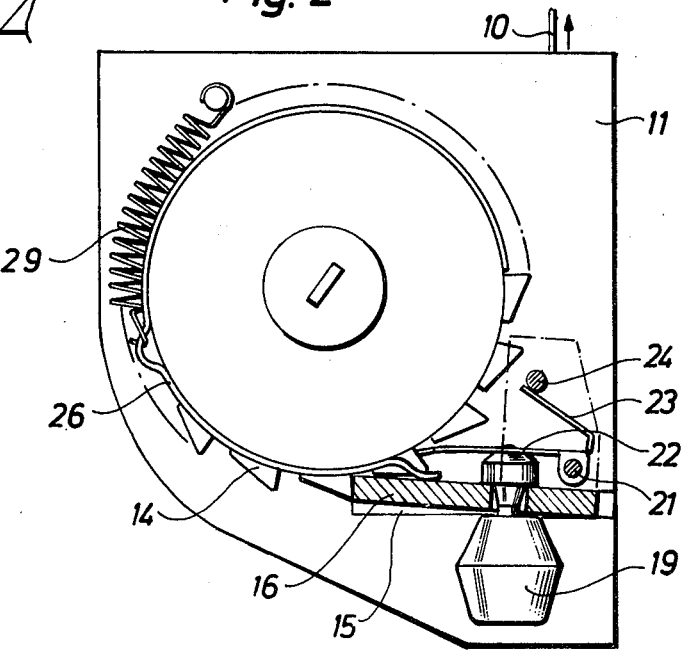
FIG. 2 shows a view of the emergency locking mechanism similar to that illustrated in FIG. 1, but with the locking mechanism in its locked position.

In the drawings, in particular FIGS. 1 and 2, 11 denotes one side or leg of a generally U-shaped casing of an emergency locking mechanism for a seat belt 10. In the figures, the automatic locking device is shown to be mounted at the outside of the casing side 11, and the spool from which the webbing strap 10 is unwound is shown lying behind the side 11. The spindle 12 of the spool on which the strap is wound projects through and outside of the casing side 11 and supports thereon a ratchet-wheel 13, the cogs or teeth 14 of which are illustrated schematically in the lower half of FIGS. 1 and 2.

Mounted below the spool, not shown here, and running between two slots 15 cut in the parallel sides of the U-shaped casing, or lying in one or more slots in one of the sides, is a pawl 16, which projects through that side 11 of the casing visible to the observer in FIG. 1. The slot 15 is so shaped that the pawl 16, when in its lower or inactive position as shown in FIG. 1, lies outside the radius of the top of the teeth 14; whereas when in its raised or active position in the slot 15, as shown in FIG. 2, the pawl 16 will engage with the teeth 14 and arrest the motion of the ratchet-wheel 13. The pawl 16 therefore constitutes the locking element of the locking mechanism illustrated. The pawl 16 may also be mounted so as to rotate about a shaft in or close to the side of the casing.

The pawl 16 is provided with an opening 17 through which passes the rod 18 of a pendulum 19, and to the upper end of which rod is attached a knob 20 resting on the upper side of the pawl 16. Mounted on a spindle 21, which forms an axis of rotation affixed relative to the pawl 16, is an arm 22, the underside of which bears on the pendulum knob 20 in such a manner that the end of the arm 22 pointing towards the ratchet-wheel 13 will not mesh with the teeth 14 while the pendulum remains in its vertical, or neutral, position. When the pendulum 19 is displaced from the vertical, in the manner described below, the arm 22 is moved round its axis of rotation 21 and the end of the arm pointing towards the ratchet-wheel 13 will thus engage with one of the teeth 14 of the ratchet-wheel. Attached to the arm 22 is a member 23, which is bent upwardly normally to lie a short distance below a pin 24, which is mounted on a vertical plate 25 that is either integral with or united with the pawl 16. When the arm 22 rotates clockwise about its mounting point 21, the member 23 will also rotate about this point and strike the pin 24, whereafter continued rotation of the arm 22 and member 23 will propel the pin 24 and the plate 25 to which the pin is attached. Since the plate 25 is also joined to the pawl 16, the rotation of the arm 22 and member 23 will cause the pawl 16 to be raised in its triangular slot 15 to the position shown in FIG. 2.

The flange-shaped pawl 16 (comprising the locking device) is retained in the position shown in FIG. 1 by a spring, which in the version of the invention illustrated here consists of a wire element 26 running round the hub of the ratchet-wheel 13, or round a casing housing the latter, and having one end 27 bent downwardly so as to bear upon the pawl 16. A part of this wire element 26 is given the shape of a loop 28, in which is fastened one end of a coiled spring 29, the other end of this spring being secured to a pin 30 rigidly united with the side 11 of the casing. This arrangement is to return the pawl 16 to the position shown in FIG. 1 when the mechanism is in the neutral position. The spring mechanism may also be constructed according to principles other than these and may be combined with the housing named above, which should preferably be of plastic, so that a tongue projecting from the housing constitutes a spring while another tongue lies close to or bears on the pawl 16.

As has already been mentioned, the emergency locking device is designed to be rigidly mounted in a vehicle, or the like, and so constructed that changes in the motion of the vehicle or the like in excess of pre-set magnitudes, such as sudden acceleration, deceleration, etc., will prevent the seat belt 10 from unwinding further by causing the locking mechanism to engage. This locking is achieved when the pendulum 19 is displaced from its neutral position and lifts the arm 22 until it engages with the teeth 14 of the ratchet-wheel 13. As the ratchet-wheel continues rotating under tension from the webbing or belt 10, force is transferred by the ratchet-wheel 13 to the arm 22, which consists of a light, flexible element such as a thin strip or wire, thus causing the arm 22 to continue rotating about the spindle 21, bending in the process. The member 23 of the arm 22 then strikes the pin 24 anchored to the plate 25, tending to convey pivotal motion to the plate, and hence also to the pawl 16 to which the plate is joined. The pawl 16 is thereby made to turn in the slot 15 until it reaches the position shown in FIG. 2 where the pawl 16 has taken over the locking function from the arm 22 and locks the mechanism by preventing the ratchet-wheel 13, which is united with the spindle 12 of the webbing spool, from rotating further. When the pawl 16 is raised, as shown in FIG. 2, the spring 29 is tensioned through the action of the wire element 26. When the tension in the webbing 10 eases, the spring 29 will return the pawl 16 to the position shown in FIG. 1 through the action of the wire element 26 and, if the pendulum 19 is vertically suspended, i.e. unaffected by the movement of the vehicle, the arm 22 will thus be enabled to return to the position shown in FIG. 1 in which the arm 22 lies outside the path of the teeth 14.

As is apparent from the above description, by mounting the vehicle-triggered component, such as the pendulum 19 in the pawl 16 below the arm 22, an extremely simple device has been achieved which functions quickly and reliably to lock the mechanism. Clearly the pendulum 19 is only one example of a vehicle-triggered device, and this part of the mechanism could as easily consist of a ball 19' (FIG. 2A), on the upper surface of which rests the arm 22, lying in a downward-tapering conical seat 17' in the top side of the pawl 16. When this ball rolls up the sides of the conical seat, the arm 22 will be raised and engage the teeth 14 of the ratchet-wheel 13 in the same way as when the pendulum 19 is displaced from the vertical.

Figure 3:
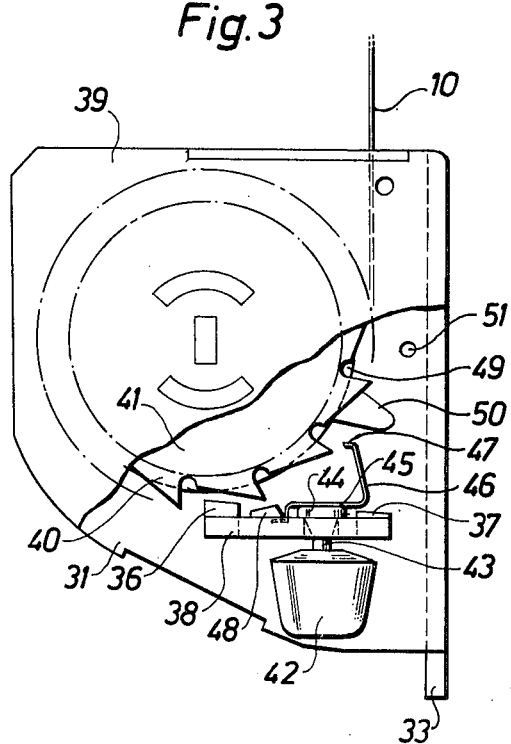
FIG. 3 shows a side elevation, partly in section, of another version of the emergency locking mechanism.
Figure 4:
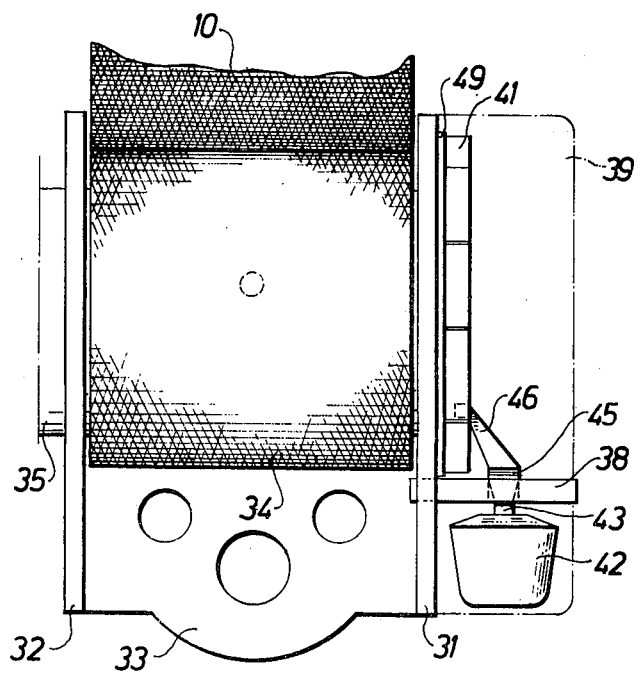
FIG. 4 shows a front elevational view of this other version.

In the versions of the lock of the invention shown in FIGS. 3 and 4, the lock is represented by the U-shaped casing with its two members 31, 32 and a retaining plate 33. The retaining plate 33 is provided with holes, not specified more closely here, for mounting the lock on a vehicle or the like. The casing 31–33 holds the spool 34 from which the webbing 10 is unwound. The webbing is wound on the spool in the customary manner by means of a spring-loaded mechanism 35 schematically illustrated beside the belt housing in FIG. 4.

Mounted in two slots, 36 and 37 respectively, cut in the side 31 of the casing is a pawl 38, having on one end two spaced pins or projections that project into the slots 36, 37. As shown in FIG. 4, the other end of the pawl 38 is supported on one or more pins (not illustrated) in a protective casing 39 schematically illustrated in FIG. 4, and which houses the locking mechanism once the webbing spool is in place. The pawl 38 may be supported in the casing 39 by a number of different methods, e.g. slots or lugs. The slots 36, 37 and mode of supporting the pawl 38 in the casing 39 are so designed that the pawl 38 is able to slew to a position where its projection in slot 36 engages with the teeth 40 of a ratchet-wheel 41, which is united with the spindle of the webbing spool 34 in the manner described above. The pawl 38 can, of course, also be designed so as to pivot on a shaft or the like.

Suspended from the pawl 38 is a pendulum 42, the middle section of which is a neck or shaft 43, and which has a knob 44 resting on the upper side of the pawl 38.

The pawl 38 also carries one end of an arm 45, a portion of which overlies and bears upon the knob 44 of the pendulum. At a point on the arm 45 opposite its mounting a part 46 of the arm is bent upwardly at an angle towards the ratchet-wheel and finishes in a tip 47 lying just outside the path described by the rotation of the teeth 40. When the pendulum is displaced from the vertical and raises the lower section 45 of the arm, the upper section 46 of the arm will swing upwardly and its tip 47 will then engage with one of the teeth 40. When this happens, a force will be exerted on the pawl 38 in a direction tangential to the ratchet-wheel 41, and the pawl will slew round its pivot, or in the slots 36, 37, causing the left-hand end of the pawl, as shown in FIG. 3, to move upwardly in slot 36 and into engagement with a tooth 40 of the ratchet-wheel and lock the mechanism. The left-hand end of the arm 45 as it appears in FIG. 3 is bent downwardly and is supported on the pawl 38 by means of a bushing 48, which allows the arm 45 to rotate about its point of support in the pawl 38.

A washer 49, of e.g. plastic, is mounted between the ratchet-wheel 41 and the side 31 of the casing, and lies freely between these, but may be set in motion by the friction of the ratchet-wheel 41 as the latter rotates. The washer is provided with a lug 50, which overlies arm 46 and moves with the washer 49 as the latter is carried along by the ratchet-wheel 41. When the webbing 10 is unwound from the spool 34, the ratchet-wheel 41 will rotate counterclockwise, as it appears in FIG. 3, as long as the locking mechanism is unactivated. The washer 49 and lug 50 are then moved by friction with the ratchet-wheel 41 as described above until the path of the lug is obstructed by a pin 51 or similar means. The washer 49 then no longer rotates with the the ratchet-wheel 41.

When the webbing is rewound on the spool 34, that is, in a clockwise direction as seen in FIG. 3, friction will again set the washer 49 and lug 50 in rotation. The lug 50 will then strike the arm 46 and press it down upon the pendulum mechanism. Under normal conditions this construction prevents the locking arm and pendulum mechanism from rattling in their mountings, e.g. by the tip 47 of the arm striking the tops of the teeth 40 of the ratchet-wheel 41. As soon as the webbing 10 is unwound the slightest distance in a counterclockwise direction as seen in FIG. 3, the washer 49 and lug 50 will be set in motion and leave the arm 46 free to engage with the ratchet-wheel 41 if the pendulum mechanism should initiate such action.

The locking mechanism illustrated in FIGS. 3 and 4 thus functions by the pawl 38 being, as it were, pulled up to engage with the ratchet-wheel 41 by the arm 45, 46. Of course, the arm 45, 46 may also be mounted on the pawl 38 so as to rotate round a shaft or in any other way allowing the pawl 38 to be pulled by the arm 46 so as to engage with the ratchet-wheel 41.

In both embodiments the return of the pawl 16, 38 to the neutral position when the locking mechanism is not operating can naturally be achieved by a spring mechanism of the type shown in FIGS. 1 and 2. However, since the pendulum 19 and 42, and the pawl 16 and 38 are of considerable combined weight, it is possible to have the pawl return to neutral through gravity alone, in which case the mechanism is simplified even further.

As is apparent from the above, the locking mechanisms of the invention as described and illustrated, are of the vehicle-triggered type, that is, they comprise an element, such as a pendulum or ball, which reacts to sudden changes in the motion of the vehicle. Clearly, however, the spool may naturally also be combined with known webbing-triggered mechanisms of any type known to the art. Such mechanisms are usually locked by some device sensitive to acceleration which reacts to sudden changes in the motion of the webbing 10 as it is unwound and causes the spool to lock. Centrifugal weights, for instance, may be arranged so as to be hurled out to engage with a toothed wheel or other similar device housed in the casing. In known emergency locking devices of the type in the introductory paragraph, the webbing-triggered and vehicle-triggered functions are often interdependent, and more particularly in that the function of the vehicle-triggered locking mechanism is dependent on the provision of a webbing-triggered mechanism. Yet another advantage of the mechanism of the invention as illustrated and described herein is that it acts quite independently and is thus not based on a webbing-triggered mechanism but may be provided quite separate therefrom.

The embodiments of the locking mechanism according to the invention described above afford considerable advantages. The simple design gives high reliability and the components used may be of robust construction yet simple and inexpensive to produce. In spite of the small dimensions of the mechanism a relatively large pendulum 19 may be used, thus ensuring that the pendulum will be displaced by pre-set changes of movement of the vehicle in which the automatic locking device is mounted.

What I claim is:
1. A device for use in emergency locking of webbing-type vehicle safety belts, comprising
 a casing adapted to be mounted in a vehicle,
 a spindle rotatable on said casing and having thereon a webbing-type safety belt,
 a ratchet wheel secured to said spindle for rotation therewith,
 a locking device interlockable with said ratchet wheel to lock said spindle against rotation in a belt unwinding direction,
 a vehicle-triggered device mounted on said locking device and disposed to be activated by pre-set changes of motion of said vehicle, and
 an arm connected to said locking device and engageable with the ratchet-wheel upon activation of said vehicle triggered device whereby force is transferred to the arm by the continued rotation of the ratchet-wheel and is passed on by said arm to the locking device which, in turn, is caused to interlock with the ratchet-wheel.
2. A device as in claim 1, wherein
 said locking device comprises a pivotal pawl upon which is mounted said vehicle-triggered device,
 said arm is mounted on said pawl so as to be capable of pivoting about a first axis, and so as to bear upon the vehicle-triggered device,
 said arm has a first member designed to engage with the ratchet-wheel for movement thereby upon the displacement of the vehicle-triggered device, and a second member disposed to cause the pawl to pivot and engage with the ratchet-wheel through movement of the pawl itself, when the first member engages with the ratchet-wheel and is moved thereby.
3. A device as in claim 2, wherein
 the second member of the arm is designed so that when the first member of the arm engages the ratchet wheel and is moved thereby, the second member strikes a fixed part of the pawl in such manner that the pressure exerted by the second member of the arm on said fixed part causes the pawl to pivot about its mounting.
4. A device as in claim 2, wherein the second member of said arm is mounted at that end of the pawl remote from the pivotal axis of the pawl so that when the first member of the arm engages with the ratchet-wheel and is moved thereby, the pawl will be caused to rotate by the pull exerted on the mounting of the second member of the arm.
5. A device as in claim 1, wherein the arm consists of a light-weight, flexible element.
6. A device as in claim 2, including means supporting said pawl in the casing to allow rotation of the pawl into and out of a locking position, a spring-loaded element bearing upon the pawl normally to urge it to a position in which it is unable to engage with the ratchet-wheel.
7. A device as in claim 6, wherein said spring-loaded element comprises a wire element running around a hub on said ratchet-wheel, with one end of said element being bent so as to bear upon the pawl.
8. A device as in claim 6, wherein said means for supporting the pawl comprises slots provided at certain places in the casing, the pawl having projections fitting into these slots.
9. A device as in claim 6, wherein said spring-loaded element comprises a leafspring shaped to fit a casing for the ratchet-wheel.
10. A device as in claim 1, wherein
 a washer is mounted against the ratchet-wheel and is so positioned as to be able to rotate in either direction by the friction of the ratchet-wheel, and
 a lug on said washer allows the washer to be rotated between a first position in which the lug bears upon a stationary surface on said casing, and a second position in which the lug bears upon said arm and presses the arm down towards the position where the locking device is inactive, said lug being so located in relation to the locking device that it is rotated towards the latter position when the webbing strap is rewound into the casing.
11. A device as in claim 2, wherein the vehicle-triggered device comprises
 a pendulum hanging beneath the pawl and supported on the upper side of the pawl by a knob, and
 a neck connecting said pendulum and said knob and passing through an opening in the pawl, and wherein
 said arm bears upon the knob of the pendulum.
12. A device as in claim 2, wherein
 the vehicle-triggered element comprises a ball mounted in a seat on the upper side of the pawl, said seat widening conically towards the top, and said arm bears on the upper surface of the ball.

* * * * *